US007450933B2

United States Patent
Kwak et al.

(10) Patent No.: US 7,450,933 B2
(45) Date of Patent: Nov. 11, 2008

(54) METHOD OF EFFICIENTLY TRANSMITTING CONTROL INFORMATION FOR MULTIMEDIA BROADCAST/MULTICAST SERVICE

(75) Inventors: No-Jun Kwak, Seoul (KR); Kook-Heui Lee, Yongin-si (KR); Sung-Ho Choi, Suwon-si (KR); Eun-Jung Kim, Suwon-si (JP); Sung-Oh Hwang, Suwon-si (KR); Chunying Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 606 days.

(21) Appl. No.: 11/057,881

(22) Filed: Feb. 14, 2005

(65) Prior Publication Data

US 2005/0233732 A1    Oct. 20, 2005

(30) Foreign Application Priority Data

Feb. 12, 2004  (KR) ............... 10-2004-0009393
Aug. 11, 2004  (KR) ............... 10-2004-0063051

(51) Int. Cl.
*H04Q 7/20*    (2006.01)

(52) U.S. Cl. .............. 455/414.1; 455/412.1; 370/259; 379/157

(58) Field of Classification Search ............... 455/414.1
See application file for complete search history.

(56) References Cited

U.S. PATENT DOCUMENTS

| 7,242,919 | B2* | 7/2007 | Kim et al. .................. 455/313 |
| 7,269,146 | B2* | 9/2007 | Pecen et al. ................. 370/312 |
| 7,277,694 | B2* | 10/2007 | Sinnarajah et al. ......... 455/414.1 |
| 7,299,062 | B2* | 11/2007 | Yi et al. ...................... 455/511 |
| 2003/0223394 | A1* | 12/2003 | Parantainen et al. ........ 370/336 |
| 2004/0116139 | A1* | 6/2004 | Yi et al. ...................... 455/503 |
| 2004/0142706 | A1* | 7/2004 | Kim et al. ................... 455/458 |
| 2004/0151133 | A1* | 8/2004 | Yi et al. ...................... 370/312 |
| 2004/0152473 | A1* | 8/2004 | Kuwano et al. ........... 455/456.2 |
| 2004/0152476 | A1* | 8/2004 | Kuwano et al. ............. 455/459 |
| 2005/0030966 | A1* | 2/2005 | Cai et al. .................... 370/432 |
| 2005/0083961 | A1* | 4/2005 | Pecen et al. ................. 370/432 |
| 2005/0101351 | A1* | 5/2005 | Lee et al. .................... 455/558 |
| 2005/0195852 | A1* | 9/2005 | Vayanos et al. ............. 370/437 |

(Continued)

FOREIGN PATENT DOCUMENTS

WO    WO 03/015440    2/2003

OTHER PUBLICATIONS

3rd Generation Partnership Project; Technical Specification Group Radio Access Network; Introduction of the Multimedia Broadcast Multicast Service (MBMS) in the Radio Access Network; Jan. 2004.

*Primary Examiner*—Matthew D. Anderson
*Assistant Examiner*—Hai V Nguyen
(74) *Attorney, Agent, or Firm*—The Farrell Law Firm, PC

(57) ABSTRACT

A paging method for an MBMS service is provided. To efficiently transmit MBMS control information in an MBMS mobile communication system, an RNC transmits to a Node B a control message including a list of NI information for MBMS paging groups by the RNC and the Node B establishes a physical channel according to the control message and transmits an MICH including NIs to UEs on the established physical channel.

15 Claims, 9 Drawing Sheets

U.S. PATENT DOCUMENTS

2006/0019641 A1* 1/2006 Vayanos et al. .......... 455/414.1
2006/0104225 A1* 5/2006 Kim et al. ................... 370/313
2006/0166653 A1* 7/2006 Xu et al. ................... 455/412.2
2006/0245386 A1* 11/2006 Hu ............................. 370/312

* cited by examiner

US 7,450,933 B2

METHOD OF EFFICIENTLY TRANSMITTING CONTROL INFORMATION FOR MULTIMEDIA BROADCAST/MULTICAST SERVICE

PRIORITY

This application claims priority under 35 U.S.C. § 119 to an application entitled "Method of Efficiently Transmitting Control Information for Multimedia Broadcast/Multicast Service" filed in the Korean Intellectual Property Office on Feb. 12, 2004 and assigned Serial No. 2004-9393, and to an application entitled "Method of Efficiently Transmitting Control Information for Multimedia Broadcast/Multicast Service" filed in the Korean Intellectual Property Office on Aug. 11, 2004 and assigned Serial No. 2004-63051, the contents of both of which are incorporated herein by reference.

BACKGROUND OF THE INVENTION

1. Field of the Invention

The present invention relates generally to an MBMS (Multimedia Broadcast/Multicast Service), and in particular, to a paging method to provide an MBMS service.

2. Description of the Related Art

Today's rapid development of communication technology has driven the development of the WCDMA (Wideband Code Division Multiple Access) mobile communication systems to provide, aside from the traditional voice service, packet data service for transmitting a large volume of data such as packet data and circuit data and multimedia broadcasting/communication. To support the multimedia broadcasting/communication, the MBMS is under discussion. The MBMS services multiple UEs (User Equipments) from one or a plurality of multimedia data sources.

The MBMS generically refers to a service of transmitting the same multimedia data to multiple users over a wireless network. The users share one radio channel, thus saving radio resources.

The MBMS supports a multimedia transmission including real-time video and audio, still images, and text. Depending on a multimedia transmission type, the MBMS can simultaneously provide audio and video data, requiring a large volume of transmission resources. Since an MBMS service transmits the same data to a plurality of cells where users are situated in an MBMS service, a point-to-point (PtP) or point-to-multiple (PtM) connection is established according to the number of users within the cells.

FIG. 1 illustrates nodes involved in the provisioning of an MBMS service over a mobile communication network.

Referring to FIG. 1, UEs 161, 162, 163, 171 and 172 (UE 1 to UE 5) are terminal devices or subscribers capable of receiving the MBMS service. Cells 160 and 170 (cell 1 and cell 2) are Node B devices for wirelessly transmitting MBMS data to the subscribers under the control of Node Bs. An RNC (Radio Network Controller) 140 controls the cells 160 and 170, selectively transmits multimedia data to the cells, and controls radio channels established for the provisioning of the MBMS service. The RNC 140 is wirelessly connected to the UEs 161, 162, 163, 171 and 172 via an RRC (Radio Resource Control) interface.

The RNC 140 is connected to a PS (Packet Switched or Packet Service) network such as the Internet through an SGSN (Serving GPRS Support Node) 130. Communications are conducted between the RNC 140 and the PS network by PS signaling. Especially a Iu-PS interface is defined between the RNC 140 and the SGSN 130. The SGSN 130 controls the MBMS-related services for the subscribers. The major functions of the SGSN 130 are to manage the service billing data for each subscriber and to selectively transmit the multimedia data to the RNC 140.

A transit network (NW) 120 provides a communication path between a BM-SC (Broadcast Multicast Service Center) 110 and the SGSN 130. The transit NW 120 can be connected to an external network through a GGSN (Gateway GPRS Support Node). The BM-SC 110 is an MBMS data source responsible for MBMS data scheduling.

Meanwhile, the RNC 140 is connected to a CS (Circuit Switched) network through an MSC (Mobile Switching Center) 150. The CS network is a connection-based, voice-oriented legacy communication network. Communications are made between the MSC 150 and the RNC 140 by CS signaling. Especially, a Iu-CS interface is defined between the RNC 140 and the MSC 150.

An MBMS data stream is delivered to the UEs 161, 162, 163, 171 and 172 through the transit NW 120, the SGSN 130, the RNC 140, and the cells 160 and 170.

While not shown in FIG. 1, a plurality of SGSNs may be involved in providing one MBMS service and a plurality of RNCs may operate under one SGSN. Each SGSN transmits data selectively to the RNC 140 and the RNC 140 transmits data selectively to a plurality of cells. To that end, lists of destination nodes are stored so that MBMS data can be selectively delivered to the nodes. The lists include an RNC list for an SGSN and a cell list for an RNC.

Context creation precedes the UEs' access to the network and receiving a service from the network. A context is defined as a set of information required for the provisioning of a service between the UEs and a network node. The major contexts are a UE context and an MM (Mobility Management) context.

FIG. 2 is a diagram illustrating a signal flow for providing an MBMS service between a UE and a network. In the illustrated case, a BM-SC 306 communicates with a UE 302 through an RNC 304.

Referring to FIG. 2, the UE 302, which intends to receive the MBMS service, registers with a service provider, the BM-SC 306 in step 310 (Subscription). The Subscription involves the exchanging of basic information associated with the billing and the service reception between the BM-SC 306 and the UE 302.

In step 320, the UE 302 acquires the basic information about the MBMS services (Announcement). For example, the basic information provides the MBMS service IDs (Identifiers) identifying the MBMS services available from the BM-SC 306 and the action times and durations of the MBMS services. An MBMS service ID includes a multicast address and an APN (Access Point Name).

In the Announcement step, the nodes between the BM-SC 306 and the UE 302, that is, the RNC 304, an SGSN, and a transit NW are provided with information related to the UE 302 and nodes connected to the UE 302. For example, the SGSN determines a list of UEs that are to receive the MBMS service and a list of RNCs having the UEs under their control. The SGSN transmits the MBMS data to only the RNCs that require the MBMS data by referring to the lists.

The UE 302 joins a desired MBMS service in step 330 (Joining). For the Joining, the UE 302 transmits to the BM-SC 306 at least one desired MBMS service ID from among the MBMS service IDs acquired in the Announcement step.

In step 340, the UE 302 is paged to be notified that the requested MBMS service will start (Notification). In the Notification step, the group paging occurs to a plurality of UEs that have joined the MBMS service, including the UE 302.

The radio resources are actually allocated between the UE 302 and the RNC 304, for the MBMS service, and information about the radio resource allocation is delivered to the associated nodes in step 350 (Radio Resource Allocation). The RNC 304 can select a PtM transmission mode or a PtP transmission mode according to the number of UEs in each of its underlying cells and its radio resource management (RRM) function.

In step 360, the MBMS data is transmitted to the UE 302 through the RNC 304 (Data Transfer). If a ciphering key for the MBMS service needs to be changed in step 306, the RNC 304 relates a new ciphering key to every UE that is receiving the MBMS service.

Upon termination of the MBMS service, the allocated radio resources are released and the release of the MBMS radio resources is notified to the UE 302 in step 370 (Radio Resource Release). While not shown, the UE 302 itself can request termination of the MBMS service and terminate the MBMS service while the data transfer is ongoing for the MBMS service (i.e. during step 360).

For the provisioning of an MBMS service, a paging message is transmitted to a plurality of UEs which have joined the MBMS service to notify them of the start of a session or the presence of the MBMS control information. To indicate the presence of the paging message, a paging indicator (PI) is transmitted to the UEs. The PI is directed to the plurality of UEs.

SUMMARY OF THE INVENTION

However, since the PI transmission mechanism defined in the present standards was designed for a PI transmission to individual UEs, its use for the MBMS paging will impose unnecessary constraints on the Iub interface. Considering that the MBMS paging is group paging, some UEs may receive an MBMS paging message for an MBMS service that they did not request, which results in a waste of battery power.

An object of the present invention is to substantially solve at least the above problems and/or disadvantages and to provide at least the advantages below. Accordingly, an object of the present invention is to provide a paging method to provide an MBMS service.

Another object of the present invention is to provide a method of setting parameters required for the paging in an RNC in an MBMS mobile communication system.

A further object of the present invention is to provide a method of configuring a physical channel for delivering a PI in an MBMS mobile communication system.

Still another object of the present invention is to provide a method of using an NBAP (Node B Application Protocol) control message to ensure for the reliable transmission of a PI from an RNC to a Node B in an MBMS mobile communication system.

Yet a another object of the present invention is to provide a method of updating significant parameters for a physical channel that delivers a PI in an MBMS mobile communication system.

Yet further object of the present invention is to provide a method of minimizing the number of transmissions of a PI from an RNC to a Node B using duration information in an MBMS mobile communication system.

The above objects are achieved by providing a paging method for an MBMS service. According to one aspect of the present invention, to efficiently transmit the MBMS control information in an MBMS mobile communication system, an RNC transmits to a Node B a control message including a list of NI information for the MBMS paging groups by the RNC and the Node B establishes a physical channel according to the control message and transmits an MICH (MBMS notification Indicator Channel) including NIs to UEs on the established physical channel.

According to another aspect of the present invention, to efficiently transmit the MBMS control information in an MBMS mobile communication system, an RNC transmits to a Node B a notification information update request message including a list of indexes associated with NIs indicating the presence or absence of the MBMS control information by the RNC, and the Node B establishes a physical channel according to the notification information update request message and transmits an MICH having the NIs corresponding to the indexes to UEs on the established physical channel by the Node B.

According to a further aspect of the present invention, to receive control information of a broadcast service in a mobile communication system having at least one UE, a cell where the at least one UE is situated, and an RNC that manages at least one cell and provides the broadcast service through the at least one cell, a UE receives from a Node B identification information identifying a physical channel established by the Node B in an SIB (System Information Block) and an NI indicating the presence or absence of paging for the broadcasting service, monitors the NI different from a PI indicating the presence or absence of control information in a paging occasion, and receives a control channel associated with the broadcasting service, in the presence of the control information indicated by the NI.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for efficiently transmitting a PI indicating the presence of a paging message to a plurality of UEs which have joined an MBMS service.

In a mobile communication system, a UE typically receives a PICH (Paging Indicator Channel) signal in a predetermined paging occasion (P0) in order to avoid unnecessary battery consumption. When a specific PI is 1 in the received PICH signal, there is a paging message for the UE. The start of P0 is determined by the ID of the UE and the repetition interval of the P0 may be preset by a CN (Core Network) or a UTRAN (UMTS Terrestrial Radio Access Network).

When the PI indicates the presence of a paging message for the UE, the UE receives a PCH (Paging Channel) transport channel carried in an S-CCPCH (Secondary Common Control Physical Channel).

However, as described in Description of the Related Art, an MBMS service serves a plurality of UEs and the MBMS control information is also directed to the plurality of UEs. Therefore, a PI indicating the presence of the MBMS control information is repeatedly transmitted for a certain duration so that all of the UEs are able to reliably detect the PI.

In relation to the above, the present invention differentiate between a PI indicating the presence of control information and a PICH carrying the PI from an NI (MBMS Notification Indicator) indicating the presence of the MBMS control information and an MICH carrying the NI.

Also, an MBMS-capable UE monitors the NI in the P0, the time when it turns on its receiver to monitor the PI and determines if the UE is paged for an MBMS service by the NI as well. The reason for monitoring the NI in the P0 is to prevent unnecessary power consumption in the UE by avoiding a repeated tuning on of the receiver for monitoring the PI and the NI.

If the NI indicates the presence of the MBMS paging for the UE, the UE receives an MCCH (MBMS Control Channel) carrying the MBMS control information. The MCCH is mapped onto an FACH (Forward Access Channel) transport channel carried in the S-CCPCH. In other words, the UE determines the presence or absence of control information of the requested MBMS service by the NI. Therefore, the RNC repeatedly transmits the NI for a predetermined duration to allow every UE requesting the MBMS service to receive the NI. The RNC may transmit the NI over a full 300-bit MICH.

For the RNC to transmit an NI associated with a specific MBMS service to a UE through its managed cell, the common physical channel MICH must first be configured in the cell.

Figure 1:
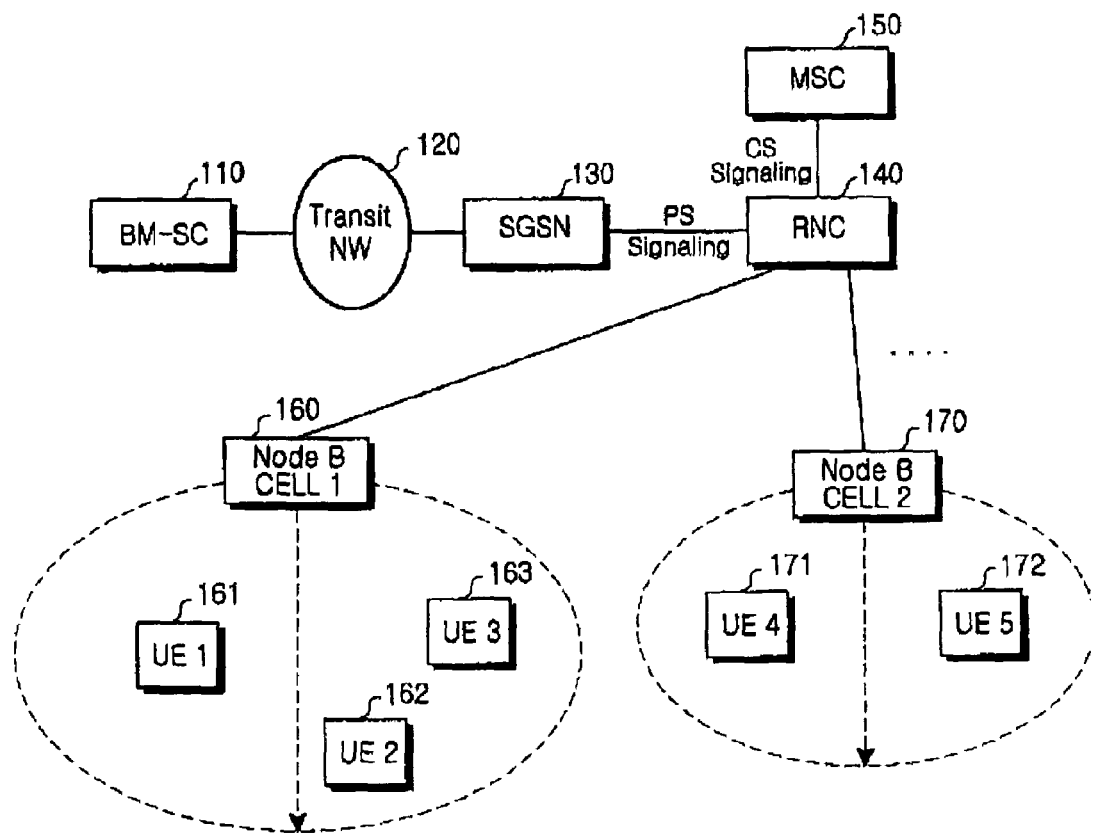
FIG. 1 illustrates a network configuration to provide an MBMS service.
Figure 2:
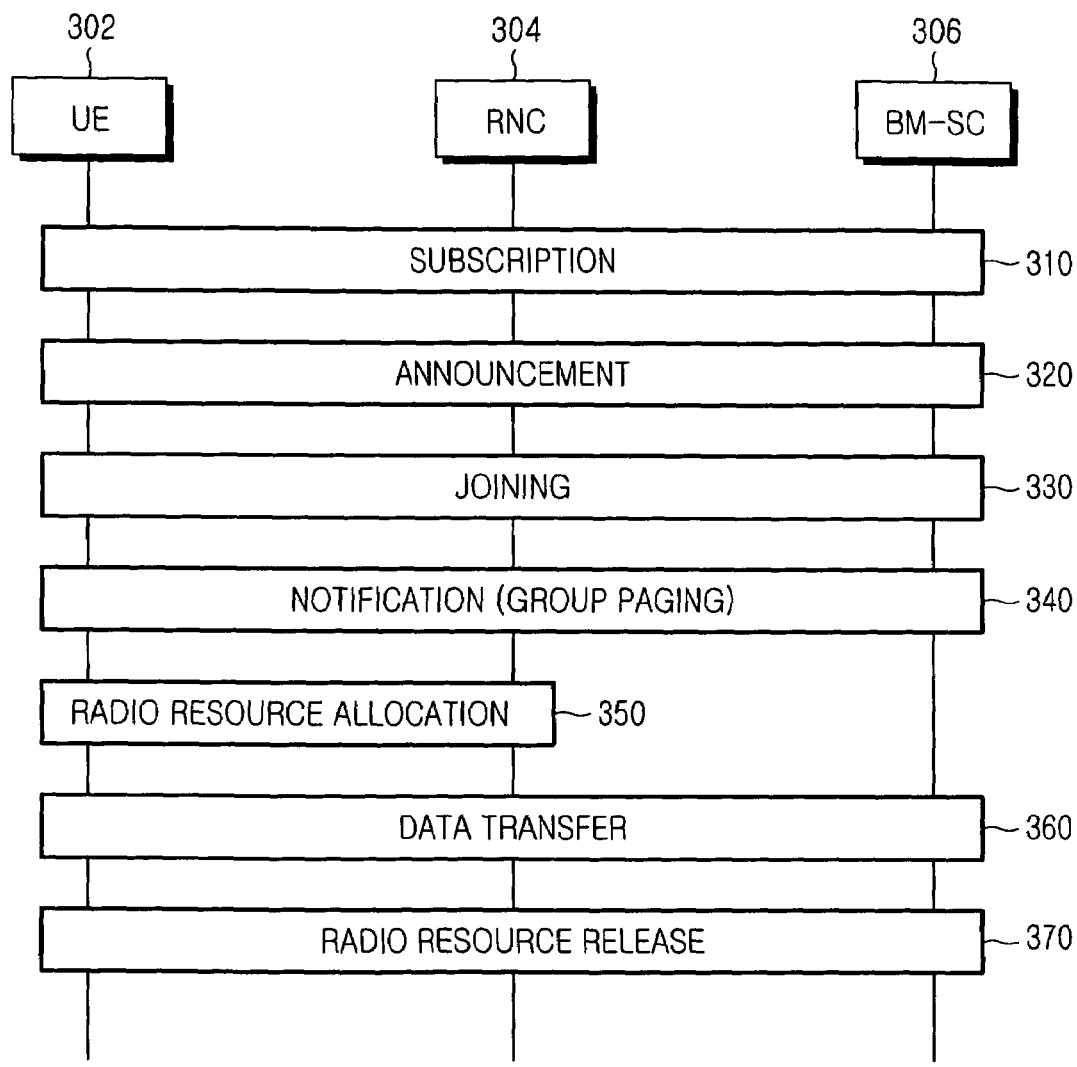
FIG. 2 is a diagram illustrating a signal flow for providing an MBMS service.
Figure 3:
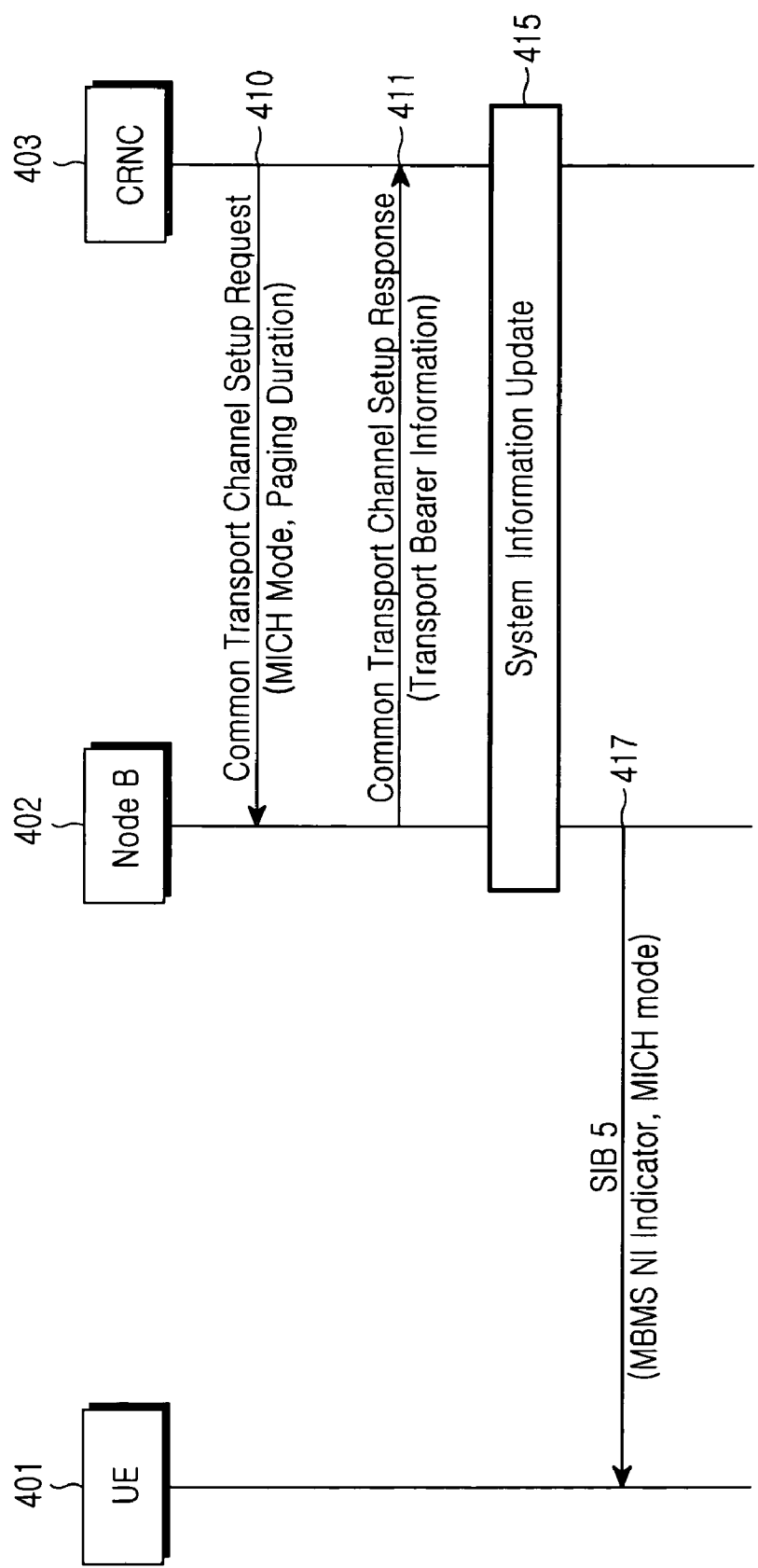
FIG. 3 is a diagram illustrating a signal flow for control message transmission/reception between an RNC and a Node B to configure an MICH (MBMS notification Indicator Channel) according to an embodiment of the present invention.

FIG. 3 is a diagram illustrating a signal flow for control message transmission/reception between an RNC and a Node B to configure the MICH.

Referring to FIG. 3, an RNC 403 (i.e. controlling RNC: CRNC) configures an MICH physical channel for delivering an NI by a Common Transport Channel (TrCH) Setup procedure in steps 410 and 411. Table 1a and Table 1b describe the newly defined MICH for carrying the NI.

For the configuration of the MICH, the following parameters are added to an existing Common TrCH Setup Request message.

TABLE 1a

| IE/Group Name | Presence | Range |
|---|---|---|
| >MICH Parameters | | 0 . . . 1 |
| >>Common Physical Channel ID | M | |

TABLE 1a-continued

| IE/Group Name | Presence | Range |
|---|---|---|
| >>FD DL Channelization Code Number | M | |
| >>MICH Power | M | |
| >>MICH Mode | M | |
| >>Paging Duration Parameters | | <0 . . . Max MBMS Paging Groups> |
| >>>Paging Group ID | M | |
| >>>Paging Duration | M | |
| >>STTD Indicator | M | |

TABLE 1b

| IE/Group Name | Presence | Range |
|---|---|---|
| >MICH Parameters | | 0 . . . 1 |
| >>Common Physical Channel ID | M | |
| >>FD DL Channelization Code Number | M | |
| >>MICH Power | M | |
| >>Modification Period | M | |
| >>STTD Indicator | M | |
| >>Choice | | |
| >>>Paging Group Parameters | | |
| >>>>Paging Group ID | M | <0 . . . Max MBMS Paging Groups> |
| >>>Service Specific Parameters | | |
| >>>>Service ID | M | <0 . . . Max MBMS Services> |

Referring to Table 1a, MICH Mode indicates the number of the MBMS paging groups included in the MICH. For example, if the MICH Mode is 3, a total of three MBMS paging groups exist. Hence, the RNC sets to 1 one NI for each MBMS paging group and transmits the NI to the Node B. The Node B then sets to 1 three 100 bit-NIs in an MICH frame and transmits the MICH frame to UEs.

The Paging Group ID identifies a group including at least one MBMS service to which the same NI is allocated. A plurality of MBMS services are grouped into one MBMS paging group identified by a paging group ID and an NI is transmitted for the MBMS paging group. Alternatively, the Paging Group ID can be set such that an NI is allocated on an MBMS service. In other words, an NI is MBMS service-specific.

The Paging Duration is a time period for which the Node B continuously transmits the NI to allow for a plurality of UEs belonging to the same MBMS paging group to reliably detect the same NI even if they have a P0 of different periods and different DRX (Discontinuous Reception) cycles in receiving the NI. The Paging Duration may be set differently for each MBMS paging group.

The parameters Paging Group ID and Paging Duration are set pairwise and a list of the Paging Group ID and the Paging Duration can be as long as the maximum number of MBMS paging groups. Or a list having only Paging Durations can be made in which the Paging Durations are arranged in a fixed ascending order of the Paging Group IDs.

If all of the MBMS paging groups have the same paging duration, the Common TrCH Setup Request message includes one paging duration.

In Table 1b, the Modification Period refers to a common paging duration of MBMS paging groups or MBMS services. The Node B is not allowed to add or exclude paging for a new service to or from a UE receiving a specific MBMS service within the modification period.

In Table 1a and Table 1b, the Common Physical Channel ID identifies the MICH. The FDD (Frequency Division Duplex) DL (Downlink) Channelization Code Number is the number of a channelization code allocated to the MICH. The MICH Power indicates a maximum allowed power allocated to the MICH.

Returning to FIG. 3, the RNC 403 transmits the Common TrCH Setup Request message including the parameters of MICH Mode and Paging Durations to the Node B 402 in step 410. In step 411, the Node B completes the Common TrCH Setup by successfully configuring the MICH for delivering the NIs.

The Node B 402 updates the MICH-associated SIB (System Information Block) information in relation to the NI transmission in step 415 and broadcasts the updated SIB information across the cell in step 417. The SIB information includes an MBMS NI indicator and an MICH mode. The MBMS NI Indicator indicates whether the newly defined MICH is used for the MBMS paging. The MICH mode has been described above referring to Table 1a and Table 1b.

Upon acquisition of the SIB information, a UE 401 periodically monitors the MICH to determine the presence or absence of the MBMS control information. The paging duration of an MBMS paging group is defined as the longest of the DRX cycles of the UEs within the MBMS paging group. Therefore, the paging duration is variable during an activated MBMS service.

By the Common TrCH Setup procedure illustrated in FIG. 3, the Node B is prepared to repeatedly transmit the NIs corresponding to the specific MBMS paging groups for the predetermined paging durations and the UE is also prepared to receive the NIs by acquiring the configuration information of the MICH that carries the NIs in an SIB.

In this way, the RNC transmits an NI to the UE to indicate the start of an MBMS session or a non-periodic MBMS control message transmission on an MCCH.

However, it is inefficient for the RNC to repeatedly transmit the NIs to the Node B during the paging durations as done in step 410 of FIG. 3.

Figure 4:
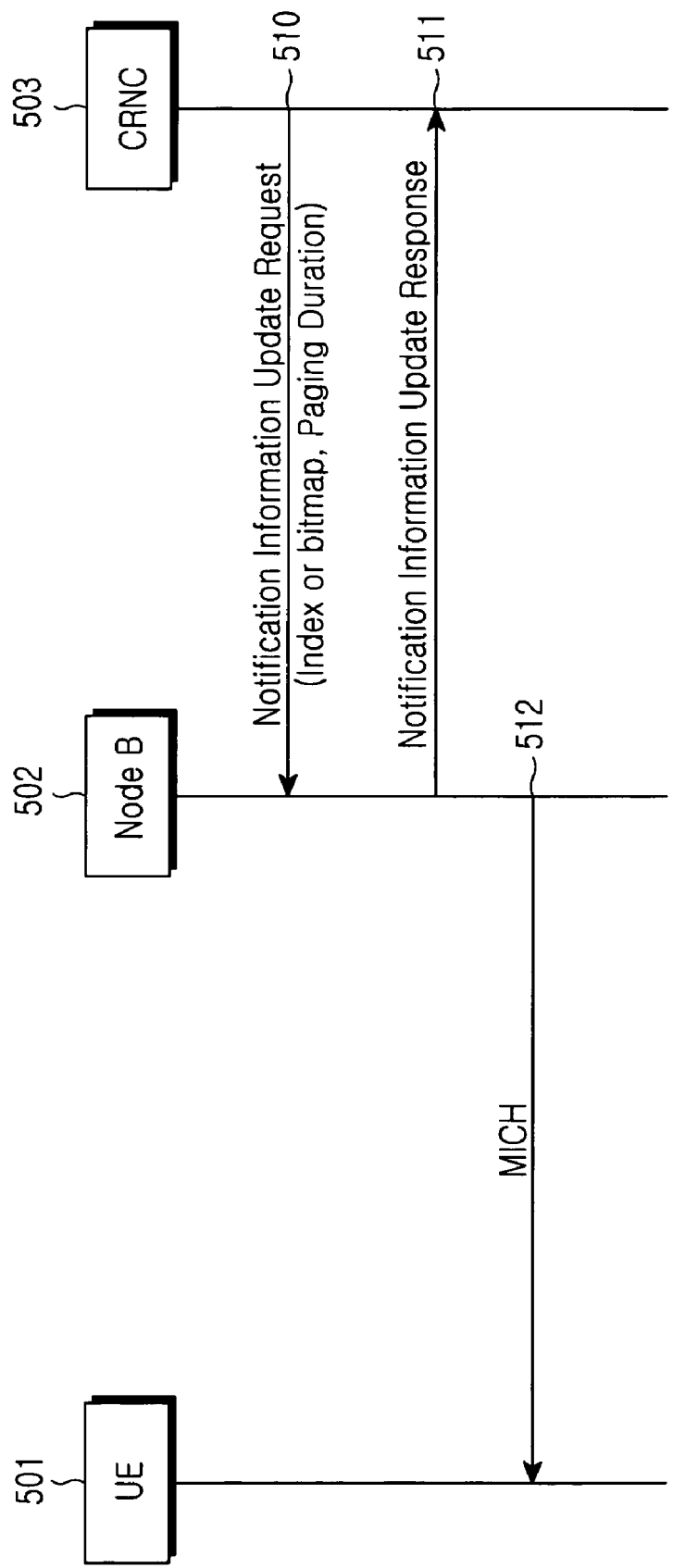
FIG. 4 is a diagram illustrating a signal flow for control message transmission/reception between the RNC and the Node B to configure an MICH according to another embodiment of the present invention.

FIG. 4 is a diagram illustrating a signal flow for message transmission/reception related to the NI transmission between the RNC and the Node B according to another embodiment of the present invention.

The RNC transmits initial NIs to the Node B at the beginning and the Node B then configures the MICH frames and repeatedly transmits them to the UE. In the case where the Node B fails to receive the initial NIs due to errors on the Iub interface, the configuration of a plurality of the PICH and the MICH frames also has errors during the paging durations. Accordingly, reliable NI transmission is essential.

In this embodiment of the present invention, therefore, the RNC transmits the NIs to the Node B by a control-plane NABP message, instead of a user-plane frame protocol message.

A Notification Information Update Request message directed from the RNC to the Node B and a Notification Information Update Response message directed from the Node B to the RNC are defined as new NBAP messages associated with the NI transmission in the present invention. The Notification Information Update Request/Response message can be transmitted through an existing Node B control port or a new MBMS control port defined according to the present invention.

The Node B control port is used to exchange the NBAP messages between an RNC and a Node B, for managing cells which are not related to a specific UE. The MBMS control port is used to exchange the NI information by the NBAP messages between an RNC and a Node B.

Referring to FIG. 4, an RNC 503 transmits the Notification Information Update Request message to a Node B 502 so that the Node B can construct an MICH frame in step 510. It is obvious that the MICH has been configured by the procedure of FIG. 3 before step 510.

The Notification Information Update Request message includes information related to the NIs to be set in the MICH frame and the changed paging durations. The NI information can be represented in one of the following two ways.

(1) Bitmap

A bitmap with as many bits as indicated by an MICH Mode is made by allocating one bit for each MBMS paging group. If a bit in the bitmap is set to 0, an NI corresponding to the bit is not transmitted. If the bit is set to 1, the NI is repeatedly transmitted for a predetermined paging duration.

(2) Index

The MBMS services for which the UEs are to be paged are divided into MBMS paging groups and IDs are allocated to the MBMS paging groups. That is, the MBMS paging groups are arranged and numbered in an ascending order. These numbers are defined as Paging Group IDs. If a Paging Group ID is included, an NI corresponding to the Paging Group ID is repeatedly transmitted for a predetermined paging group duration. If the Paging Group ID is not included, the NI is not transmitted. In this case, the paging occurs for two MBMS services within the same MBMS paging group at the same position of every frame within a modification period.

Table 2a and Table 2b below illustrate examples of the Notification Information Update Request message.

TABLE 2a

| IE/Group Name | Presence | Range |
| --- | --- | --- |
| CFN | | |
| Choice NI Information To Be Configured | | |
| >Bitmap | | |
| >>Bitmap Information | M | |
| >>Paging Duration Parameters | | <0 . . . Max MBMS Paging Groups> |
| >>>Paging Group ID | M | |
| >>>Paging Duration | M | |
| >Index | | |
| >>Index Information | | <0 . . . Max MBMS Paging Groups> |
| >>>Paging Group ID | M | |
| >>>Paging Duration | O | |

TABLE 2b

| IE/Group Name | Presence | Range |
| --- | --- | --- |
| CFN | | |
| Choice NI Information To Be Configured | | |
| >Bitmap | | |
| >>Bitmap Information | M | |
| >>Paging Duration Parameters | | <0 . . . Max MBMS Paging Groups> |
| >>>Paging Group ID | M | |
| >>>Paging Duration | M | |
| >Index | | |
| Choice Usage of Delta List | | |
| >>Full List | | |
| >>>Index Information | | <0 . . . Max MBMS Paging Groups> |

TABLE 2b-continued

| IE/Group Name | Presence | Range |
|---|---|---|
| >>>>Paging Group ID or MBMS Service ID | M | |
| >>>>Paging Duration | O | |
| >>Delta List | | |
| >>>List to Add | | |
| >>>>Index Information | | <0 ... Max MBMS Paging Groups> |
| >>>>>Paging Group ID or MBMS Service ID | M | |
| >>>>>Paging Duration | O | |
| >>>List to Delete | | |
| >>>>Index Information | | <0 ... Max MBMS Paging Groups> |
| >>>>>Paging Group ID or MBMS Service ID | M | |

The parameters listed in Table 2a and Table 2b have been described before and thus their description is not provided herein.

Referring to Table 2a and Table 2b, the RNC can select one of the Bitmap and the Index using the Choice NI Information To Be Configured in transmitting the NIs.

Also, the RNC can change a paging duration for each MBMS paging group by selectively including the Paging Duration in the Notification Information Update Request message, as illustrated in Table 2a and Table 2b.

Table 2b shows that the only difference between an MBMS paging group for which the UEs are being paged and an MBMS paging group for which the UEs will be paged can be reflected in the Notification Information Update Request message. That is, the Notification Information Update Request message includes a delta list listing the MBMS paging groups to be added to or deleted from the current MBMS paging groups.

In the present invention, the MBMS service IDs may replace the paging group IDs.

When the Bitmap is adopted, all of the MBMS paging service groups are simultaneously paged, efficiently using Iub wired resources.

Compared to the Bitmap, in the case where many of the MBMS paging groups are to be paged at the same time, the Index method can notify of the presence or absence of the MBMS paging with less bits, thereby leading to more efficient use of the Iub wired resources. Therefore, the RNC selects one of the Bitmap and the Index, for efficient use of the Iub wired resources.

The use of the Bitmap also enables the RNC to transmit to the Node B the Common TrCH Setup Request message or the Notification Information Update Request message with no paging duration information included. At the time when an NI is changed from 0 to 1 and vice versa, the RNC transmits an updated bitmap to the Node B, in a similar manner to bitmap signaling for the PICH signaling in Release 99.

Upon receipt of the Notification Information Update Request message, the Node B 502 stores the MICH configuration information and transmits the Notification Information Update Response message in step 511. In step 512, the Node B then repeatedly transmits the NIs set to 1 in successive MICH frames during the paging durations set for the MBMS paging groups, starting from a CFN set in the Notification Information Update Request message.

The paging durations have been set for the respective MBMS paging groups by the Common TrCH Setup message in step 410 of FIG. 3.

For example, if a particular NI is set to 1 at CFN #0 and the paging duration of an MBMS paging group corresponding to the NI is 200, bits of the NI set to 1 are transmitted in 200 MICH frames from CFN #0 to CFN #199. If the NI is again set to 1 at CFN #20 and the paging duration is still 200, the NI bits set to 1 are transmitted in 200 MICH frames from CFN #20 to CFN #219.

When the MBMS service-specific NIs are transmitted on the new 300-bit MICH, the NIs are matched to the MBMS service IDs, not to the MBMS paging group IDs in the present invention.

Figure 5:
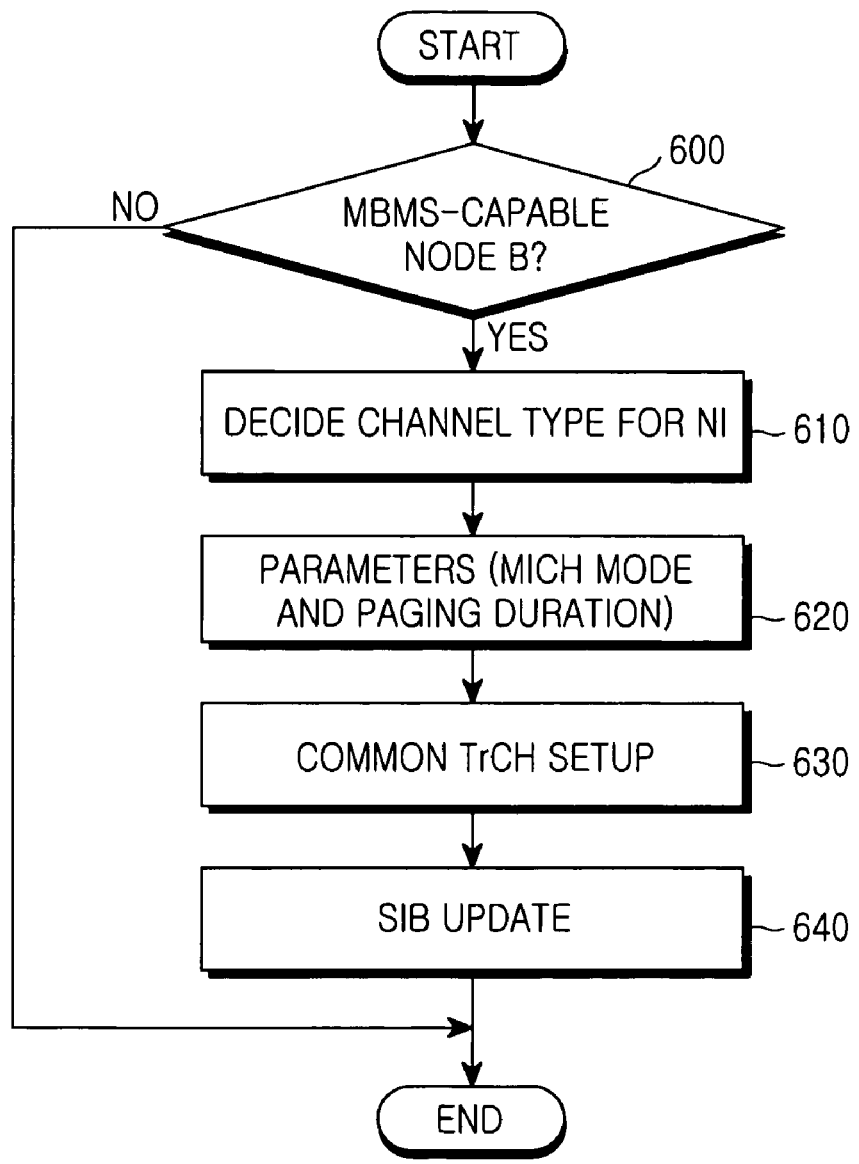
FIG. 5 is a flowchart the operation of the RNC in accordance with the procedure illustrated in FIG. 3.

FIG. 5 is a flowchart of the operation of the RNC in accordance with the procedure illustrated in FIG. 3.

Referring to FIG. 5, when the RNC intends to establish the MICH in the Node B, it determines if the Node B is MBMS-capable in step 600. If the Node B is MBMS-capable, the RNC selects the common physical channel, the MICH for carrying the NIs using an RRM function or a value predetermined by an operation and maintenance network provider in step 610.

In step 620, the RNC determines the parameters by which to configure the MICH. The parameters include an MICH mode and the paging durations. The RNC configures the MICH by the Common TrCH Setup procedure in step 630.

In step 640, the RNC updates the SIB information by an SIB Update procedure so that the Node B can broadcast the configuration information of the MICH to UEs.

Figure 6A:
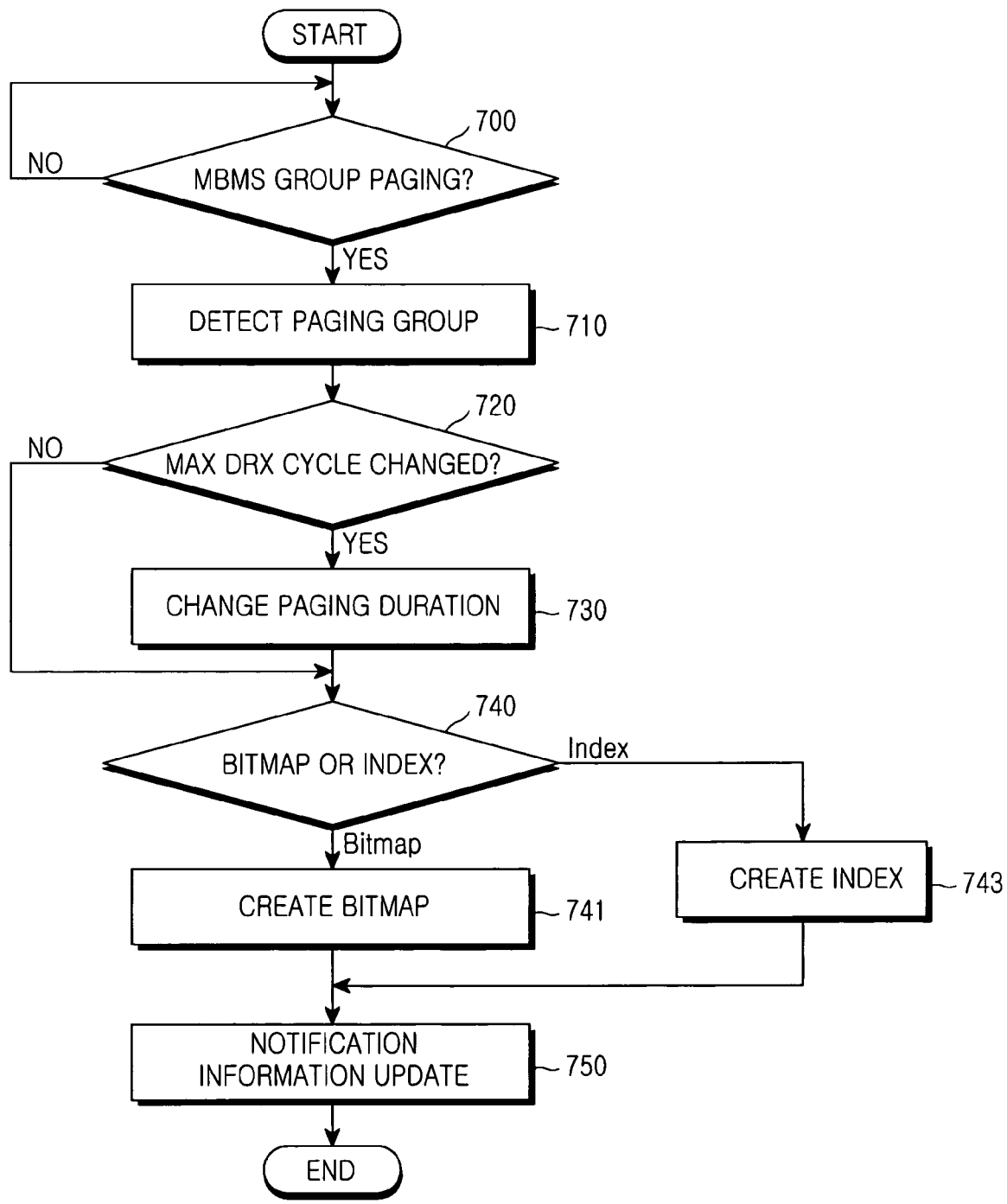
FIG. 6A is a flowchart illustrating the operation of the RNC in accordance with the procedure illustrated in FIG. 4 according to an embodiment of the present invention.

FIG. 6A is a flowchart illustrating the operation of the RNC in accordance with the procedure illustrated in FIG. 4 according to an embodiment of the present invention.

Referring to FIG. 6A, when the RNC needs the group paging for an MBMS service in step 700, the RNC determines an MBMS paging group that the MBMS service belongs to in step 710. If the UEs are changed in the cells under the control of the RNC due to their mobility, the longest of the DRX cycles of the UEs may be changed as the paging duration of the MBMS paging group. Or the RNC itself can change the DRX cycle by the RRM function.

If the maximum DRX cycle is changed for the above reason in step 720, the RNC changes the paging duration of the MBMS paging group. If the maximum DRX cycle is kept unchanged, step 730 is not performed. In step 740, the RNC selects one of the Bitmap or the Index as an NI transmission scheme.

In the case of the Bitmap selection, the RNC creates a bitmap with as many bits as indicated by an MICH mode by allocating one bit to each of the MBMS paging group and transmits to the Node B the bitmap by a Notification Information Update Request message in step 741. An NI for an MBMS paging group to be paged is set to 1.

In the case of the Index selection, the RNC determines whether to perform the MBMS paging on an MBMS paging group basis or on an MBMS service basis and transmits a full list of the paging group IDs of the MBMS paging groups or the IDs of MBMS services to be paged by the Notification Information Update Request message according to the determination result in step 743.

If there are many MBMS service IDs for paging, the RNC groups the MBMS service IDs into the MBMS paging groups and respectively allocates the indexes to them, and transmits the indexes to the Node B by the Notification Information Update Request message.

In step 750, the RNC completes updating of the notification information by receiving a Notification Information Update Response message from the Node B.

Figure 6B:
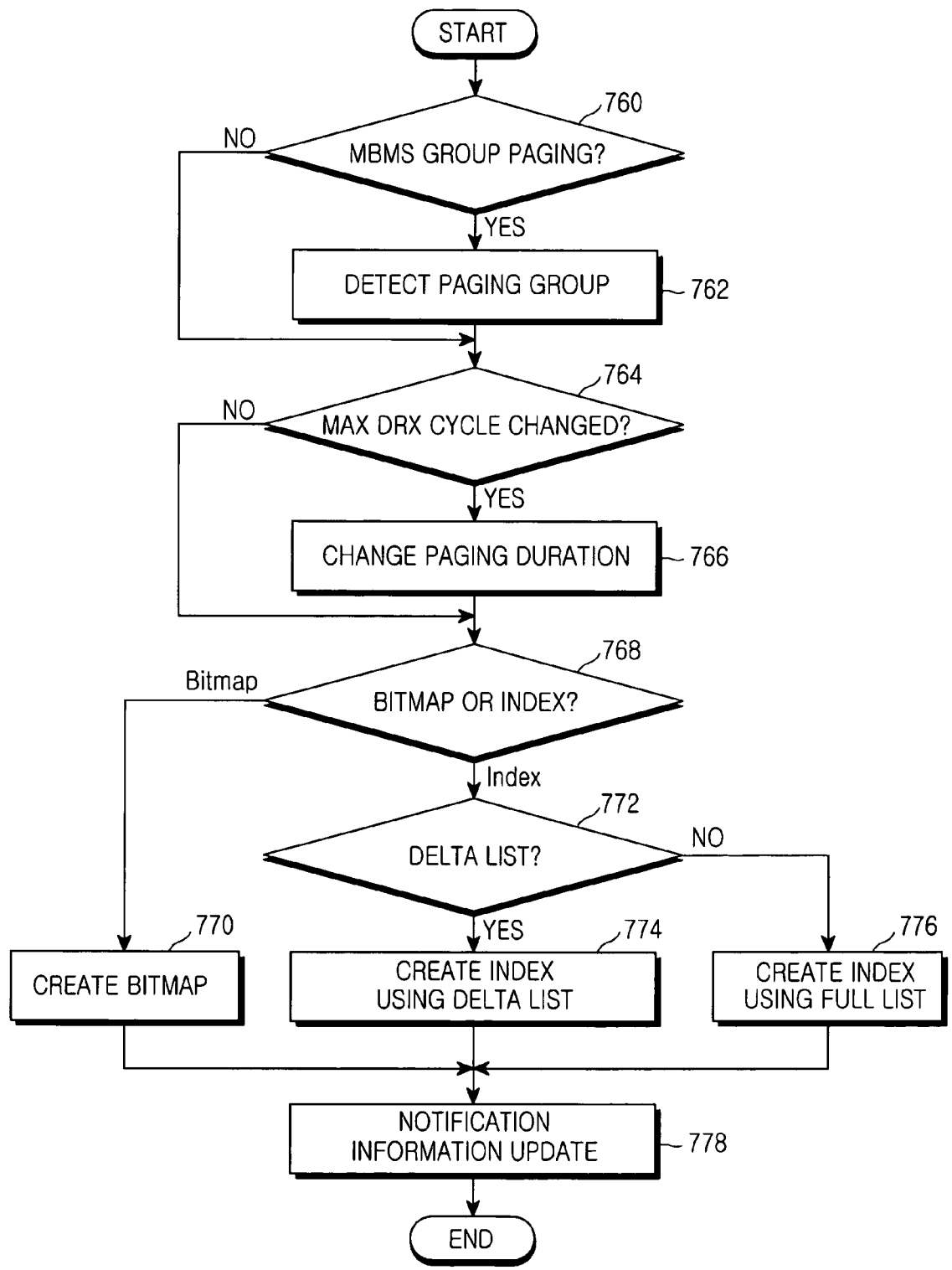
FIG. 6B is a flowchart illustrating the operation of the RNC in accordance with the procedure illustrated in FIG. 4 according to another embodiment of the present invention.

FIG. 6B is a flowchart illustrating the operation of the RNC in accordance with the procedure illustrated in FIG. 4 according to another embodiment of the present invention. A delta list of the MBMS paging groups to be added or deleted is used in the procedure of FIG. 6B.

Referring to FIG. 6B, step 760 through step 770 are performed in the same manner as step 700 through step 741 illustrated in FIG. 6A.

When the RNC decides to transmit the NIs by the Index, the RNC determines whether to use the delta list or a full list of the paging group IDs to be paged in step 772. In the latter case, the RNC goes to step 776.

In the former case, the RNC goes to step 774. The RNC creates the NI information in a corresponding format and transmits the NI information by a Notification Information Update Request message in step 774 or step 776. In step 778, the RNC completes the updating of the notification information by receiving a Notification Information Update Response message from the Node B.

Figure 7:
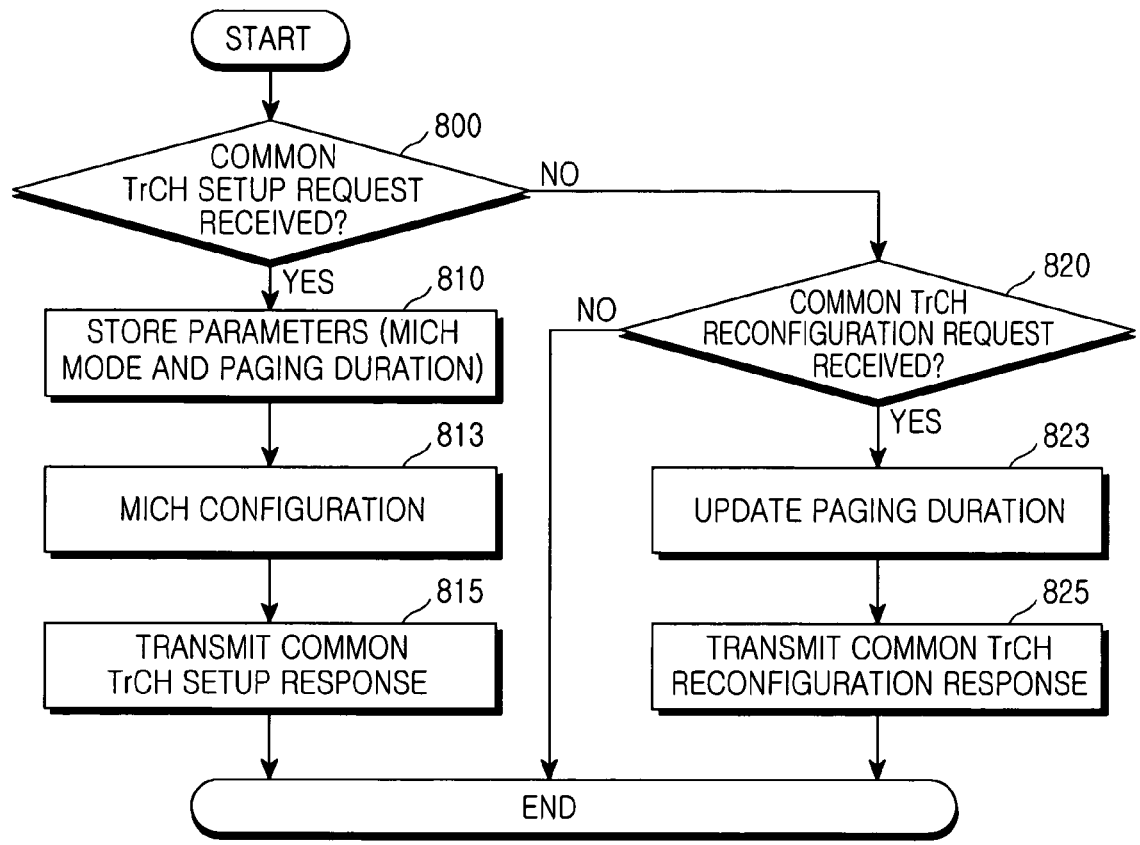
FIG. 7 is a flowchart illustrating the operation of the Node B in accordance with the procedure illustrated in FIG. 3.

FIG. 7 is a flowchart illustrating the operation of the Node B in accordance with the procedure illustrated in FIG. 3.

Referring to FIG. 7, the Node B determines if a received message is a Common TrCH Setup Request message in step 800. If it is, the Node B stores the critical parameters for the MICH configuration, namely an MICH mode and the paging durations set in the message in step 810.

The Node B configures the MICH based on the MICH mode and the paging durations in step 813 and transmits a Common TrCH Setup Response message to the RNC in step 815.

On the other hand, if the received message is not the Common TrCH Setup Request message in step 800, the Node B determines if it is an NBAP message including a parameter (paging duration) to be updated in step 820. If it is, the Node B updates the paging duration with a changed one in step 823. In step 825, the Node B reconfigures the MICH based on the updated paging duration and transmits a response message to the RNC.

Figure 8:
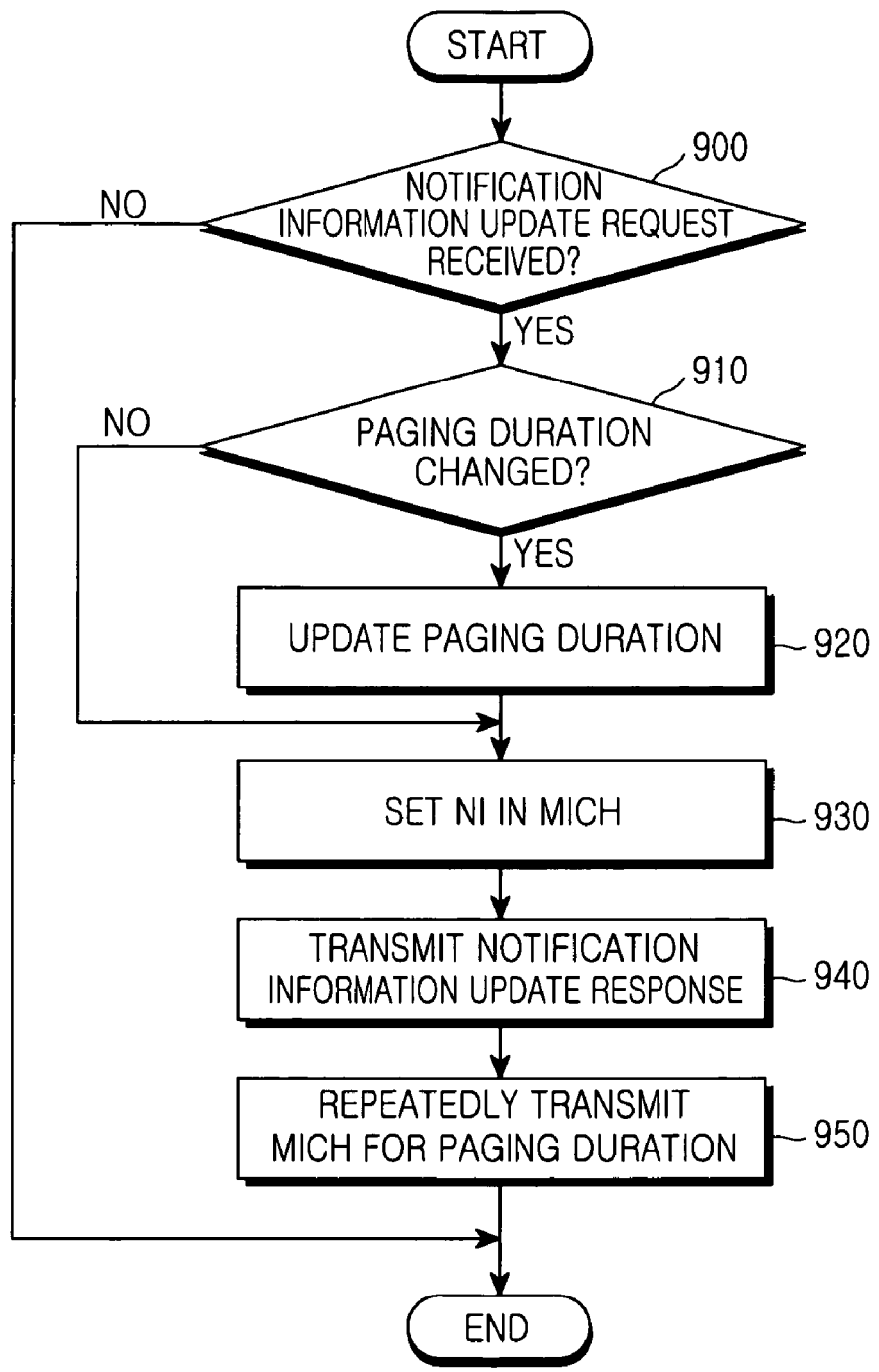
FIG. 8 is a flowchart illustrating the operation of the Node B in accordance with the procedure illustrated in FIG. 4.

FIG. 8 is a flowchart illustrating the operation of the Node B in accordance with the procedure illustrated in FIG. 4.

Referring to FIG. 8, the Node B receives a Notification Information Update Request message from the RNC in step 900 and determines from the message if a paging duration has been changed in step 910.

If a change has occurred to the paging duration, the Node B updates the paging duration of an MBMS paging group or an MBMS service associated with the change and reconfigures an MICH in step 920. In step 930, the Node B then constructs an MICH frame based on the NI information set in the message.

The Node B notifies the RNC of the successful paging duration update by transmitting a Notification Information Update Response message in step 940 and transmits the MICH frame to the UEs supporting the MBMS service, starting from a CFN set in the Notification Information Update Request message in step 950. In this way, the MICH frame repeatedly transmits NIs to the UEs for the paging durations set on an MBMS paging group basis or on an MBMS service basis.

In accordance with the present invention as described above, a UE monitors both the PI and the NI in its specific paging occasion, thereby saving power in an MBMS mobile communication system. Also, since an RNC transmits to a Node B a control message including a list specifying the MBMS paging groups or the MBMS services to be paged and their paging durations, the MBMS signaling can be efficiently carried out.

Advantageously, the number of messages transmitted from the RNC to the Node B is minimized and the MBMS paging information is transmitted reliably by the control message. Furthermore, as the Node B repeatedly transmits to a UE the MBMS paging information during a paging duration set in the control message, the transmission reliability of the MBMS paging information for the UE is ensured.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting Multimedia Broadcast/Multicast Service (MBMS) control information from a Radio Network Controller (RNC) in an MBMS mobile communication system, comprising the steps of:
    (1) transmitting, from the RNC to a Node B, a control message including parameters containing an MBMS notification Indicator Channel (MICH) mode to configure an MICH; and
    (2) establishing, by the Node B, a physical channel according to the control message and transmitting an MICH including an MBMS notification indicator (NI) to user equipments (UEs) on the established physical channel.

2. The method of claim 1, wherein the parameters are transmitted between the RNC and the Node B through an MBMS control port.

3. The method of claim 1, wherein the control message is a control-plane Node B Application Part (NBAP) message.

4. The method of claim 3 wherein the control message is transmitted through a notification information update request message from the RNC to the Node B.

5. The method of claim 4, wherein the notification information update request message further includes index information defining at least one NI group with modified NI duration for an MBMS service ID.

6. The method of claim 4, further comprising transmitting System Information Block SIB to the UEs before transmitting the MICH wherein the SIB includes the information indicating whether to use the MICH, the said at least one NI group, and the NI duration for each MBMS service according to each MBMS service ID.

7. The method of claim 1, wherein the control message includes index information defining at least one NI group with a modified NI duration for an MBMS service IDentification (ID).

8. The method of claim 2, wherein the control message further includes bitmap information allocating one bit for the at least one NI group for an MBMS service ID.

9. The method of claim 7, wherein step (2) further comprises paging, by the Node B, the UEs by transmitting the MICH configured periodically according to the at least one NI group.

10. The method of claim 9, further comprising periodically paging the UEs by transmitting the MICH configured according to the at least one NI group in the Node B.

11. A method of receiving Multimedia Boradcast/Multicast Service (MBMS) control information by a User Equipment (UE), in an MBMS mobile communication system comprising the steps of:
    (1) receiving, from a Node B, System Information Block (SIB) and determining whether the Node B configures an MBMS notification Indicator Channel MICH using the SIB, wherein the MICH indicates the presence or absence of the MBMS control information for an MBMS service according to an MBMS service IDentification (ID) reuuested by the UE;

(2) monitoring an MBMS Notification Indicator (NI) indicating the presence or absence of the MBMS control information and a Paging Indicator (PI) indicating the presence or absence of control information in a paging occasion; and (3) receiving an MBMS Control CHannel (MCCH) associated with the MBMS service, according to the monitored NI in the MICH.

12. The method of claim 11, wherein step (1) further comprises receiving, in the Node B, a control message including at least one modified NI duration for an MBMS service according to an MBMS service ID from a Radio Network Controller (RNC) and transmitting the configured MICH to page an NI group including the UE.

13. The method of claim 12, wherein step (1) further comprises receiving, in the Node B, the control message the RNC through an MBMS control port.

14. The method of claim 12, wherein step (1) further comprises receiving, in the Node B the control message from the RNC through a notification information update request message.

15. The method of claim 12, wherein step (2) further comprises periodically monitoring, by the UE, the MICH according to the modified NI duration using the SIB.

* * * * *